United States Patent [19]
Smith et al.

[11] Patent Number: 5,998,892
[45] Date of Patent: Dec. 7, 1999

[54] ROTARY POSITION SENSOR WITH INSERT MOLDED COIL WINDING

[75] Inventors: Scott D. Smith, South Bend; John Pillow, III, Elkhart; Murray Kaijala, Elkhart; John R. Gietzen, Elkhart; Stephen V. Stepke, Elkhart; Steve E. Villaire, Elkhart; Jeffrey A. Fritz, Goshen; Michael J. Smith, Nuneaton, all of United Kingdom

[73] Assignee: CTS Corporation, Elkhart, Ind.

[21] Appl. No.: 09/034,764

[22] Filed: Mar. 4, 1998

Related U.S. Application Data

[63] Continuation of application No. PCT/US96/14524, Sep. 4, 1996
[60] Provisional application No. 60/003,221, Sep. 5, 1995.

[51] Int. Cl.⁶ ........................................ H02K 11/00
[52] U.S. Cl. ........................ 310/68 B; 251/129.01; 251/129.11
[58] Field of Search ................ 310/68 B, 67 R; 338/118, 162, 184, 190; 251/129.01, 129.11

[56] References Cited

U.S. PATENT DOCUMENTS

| | | | |
|---|---|---|---|
| 2,462,761 | 2/1949 | Momberg | 310/169 |
| 3,480,812 | 11/1969 | Hershberger | 310/168 |
| 4,139,831 | 2/1979 | Ortlieb et al. | 33/128 |
| 4,398,135 | 8/1983 | Busch et al. | 318/443 |
| 4,463,291 | 7/1984 | Usry | 318/254 |
| 4,601,271 | 7/1986 | Ejiri et al. | 123/361 |
| 4,853,567 | 8/1989 | Muramatsu et al. | 310/67 R |
| 5,111,098 | 5/1992 | Peck et al. | 310/268 |
| 5,113,172 | 5/1992 | Lang | 338/171 |
| 5,689,994 | 11/1997 | Nagai et al. | 74/89.15 |
| 5,738,072 | 4/1998 | Bolte et al. | 123/399 |

FOREIGN PATENT DOCUMENTS 0 375 050 B1   12/1989   European Pat. Off. .

*Primary Examiner*—Nestor Ramirez
*Assistant Examiner*—Joseph Waks
*Attorney, Agent, or Firm*—Albert W. Watkins; Mark R. Bourgeois; Michael W. Starkweather

[57] ABSTRACT

A motor stator 400 is integrated with a position sensor 200 through a novel attachment ring 600. Electrical connection to the integrated device is through terminals 202, 210 that pass through the position sensor housing 250. The stator 400 is preferably overmolded, though other suitable forms of encapsulation are contemplated. The attachment ring 600 is preferably ultrasonically bonded to the sensor 200 during manufacture, prior to insertion of the motor armature 430. Other methods of attachment are contemplated, and various types of motors and sensors are also contemplated.

16 Claims, 3 Drawing Sheets

ROTARY POSITION SENSOR WITH INSERT MOLDED COIL WINDING

CROSS REFERENCE TO RELATED APPLICATIONS

This application is a continuation of international application number PCT/US96/14524, filed Sep. 4, 1996, (status, pending, etc.); incorporated in entirety by reference hereby.

This application is a continuation in part of U.S. application 06/003,221, filed Sep. 5, 1995, entitled "Rotary Position Sensor with Insert Molded Coil Winding".

BACKGROUND OF THE INVENTION

1. Field of the Invention

This invention pertains to servomotors and servomechanisms generally, and in one facet, to throttle position sensors integrated with throttle actuator motors.

2. Description of the Related Art

For many years, man has relied upon motors to assist in various work functions. With the advent of more advanced electrical and electronic circuits, motors have been controlled by these circuits to improve efficiencies, provide precision placements or timings, and perform other various monitoring and control functions. Motor control has enabled man to use motors in applications beyond those strictly requiring great force or enduring power.

Motors today are used for positioning with more precision in space or time than obtainable with hand manipulation, and in environments which are inhospitable to human presence. These motors, commonly referred to as servomotors, form a part of a servomechanism. The control of the servomotor is often derived from a sensor directly attached to the motor, and may also be derived from other remote sensors. The servomotor may include a rotary, linear or other type of motor, depending upon the requirements of each specific application.

Machines as complex as most transportation vehicles today have many applications for servomechanisms. One specific application involves the control of internal combustion engine throttle. Control of throttle in passenger cars and trucks is usually dependent upon the position of an accelerator pedal, which represents vehicle operator demand. The accelerator pedal position, or demand, is then linked to the engine throttle. Accelerator pedal movement was transmitted for many years through mechanical linkages consisting of solid rods and ball joints. In some applications, the solid rod linkage was replaced by a cable within a sleeve, referred to in the trade as a Bowden cable. These mechanical linkages are prone to problems which tend to affect all mechanical systems, such as sticking, freezing, breakage, and other mishaps. In addition, adaptation of the mechanical linkages to allow for special features such as more efficient energy utilization, reduced emissions, idle speed control, and "limp-home" modes of operation are generally not practical, or even possible in some cases.

By using a sensor to sense accelerator demand, a servomotor to control the throttle position, and a computer system to control operation of the throttle relative to the input from the accelerator pedal sensor and other various sensed inputs, a variety of special features may be incorporated into the accelerator-throttle linkage. In these computer-assisted systems, the throttle linkage is commonly referred to as a "drive-by-wire" system, since the linkage is electrical.

The servomechanism becomes a remote control system, since a vehicle operator within a climate controlled passenger compartment controls a throttle located in the harsh climate of an engine compartment. In fact, remote control is a very common use for servomechanisms. The control of functions ranging from TV and radio tuners to space shuttle door releases and valve controls all are remote control applications. Once again, the desire for remote control may stem from precision in timing or positioning achievable from the servomechanism, or from the need to control a function in a harsh environment where human interventions may not be practical.

Each of these applications require a motor, and also a sensor to sense the position of the motor. A number of schemes have been devised for coupling the sensor to the motor, including magnetic coupling, where the sensor detects the magnetic flux produced by certain section of the armature optical coupling, where a toothed wheel breaks a passage of light or a reflective surface reflects the light during rotation; mechanical coupling, where the motor armature is used to directly drive the sensor or drive the sensor through such mechanical devices as gears, and other known methods. Each of these different coupling methods has benefit in specific applications.

In addition to coupling the sensor and the motor, the sensor must also be physically positioned relative to the motor. Direct integration between the motor stator, also sometimes referred to as the field winding, and the sensor is desirable, since parts counts are reduced and common functions may be removed to avoid duplication and reduce cost. In the prior art, direct integration often involved the placement of an open frame sensor, often of the resistive or magnetic field sensing type, directly within a servomotor housing designed to contain both the motor and the sensor. The relatively light weight sensor is easily carried within the more rugged motor housing, and the housing does not need to be duplicated for both components. Unfortunately, in this type of prior art servomotor, the sensor is exposed to contaminants from the motor which are adverse to the life and reliability of the sensor. In addition, less control is available over the contactor, paint and lubricant. All three must be carefully controlled to ensure long life and reliability of the sensor. For example, a sensor designed to operate through tens or hundreds of millions of cycles will fail after only a few million cycles if the contactor is bent. In addition, the motor may be destroyed if some part of the sensor should detach, flow or bend and interfere with motor movement.

An alternative prior art design combines a fully housed, assembled and tested sensor with a similarly housed and assembled motor. The sensor is merely driven from the motor shaft, with no other interaction between the two components. This design eliminates any concerns about contamination of the sensor or motor. Unfortunately, the parts which must be handled, inventoried, and serviced is also greater, as is the cost of the components. Furthermore, the fully housed sensor of the prior art generally includes a separate set of bearings from the motor, leading to potential axial misalignment of bearings, which will result in early failure of the sensor bearings. In fact, proper axial alignment is very crucial to the longevity of a servomotor.

SUMMARY OF THE INVENTION

A position sensor is combined with a coil by a novel retaining ring. Electrical connection of the coil is achieved entirely through the position sensor, which is housed separately from the coil. In one facet of the invention, the coil is cylindrical and coaxial with the position sensor, and the position sensor is a rotary type potentiometer. In another facet of the invention, the retaining ring is ultrasonically bonded to the potentiometer housing and clamps a lip on the coil housing to retain the coil to the position sensor. In another facet of the invention, a throttle shaft is actuated by a servomotor which is formed as an integral structure and terminated through terminals extending from the servomotor position sensor housing.

OBJECTS OF THE INVENTION

A first object of the invention is the integration of a sensor and motor to form a servomotor. Another object of the invention is to form a reliable servomotor which is capable of exposure to harsh and rugged environments while still retaining high reliability and long life. Yet another object of the invention is a reduced piece part servomotor which may be produced with high yield in modular fashion with minimal waste and maximum yield. These and other objects of the invention are achieved in the preferred embodiment, which may be understood from the following description and drawing figures.

DESCRIPTION OF THE PREFERRED EMBODIMENT

Figure 1:
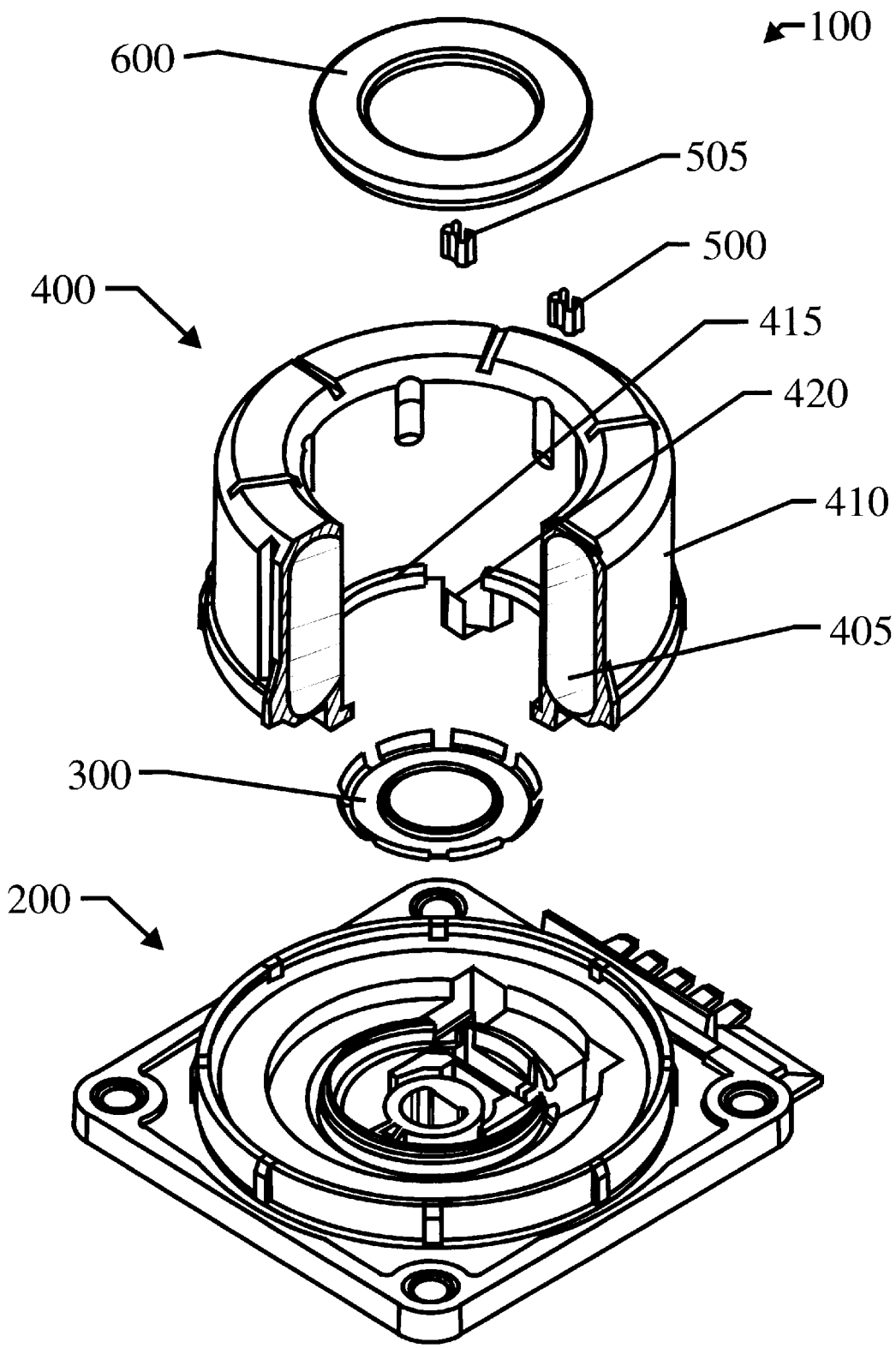
FIG. 1 illustrates a preferred embodiment servomotor in accord with the invention from an exploded perspective view.
Figure 2:
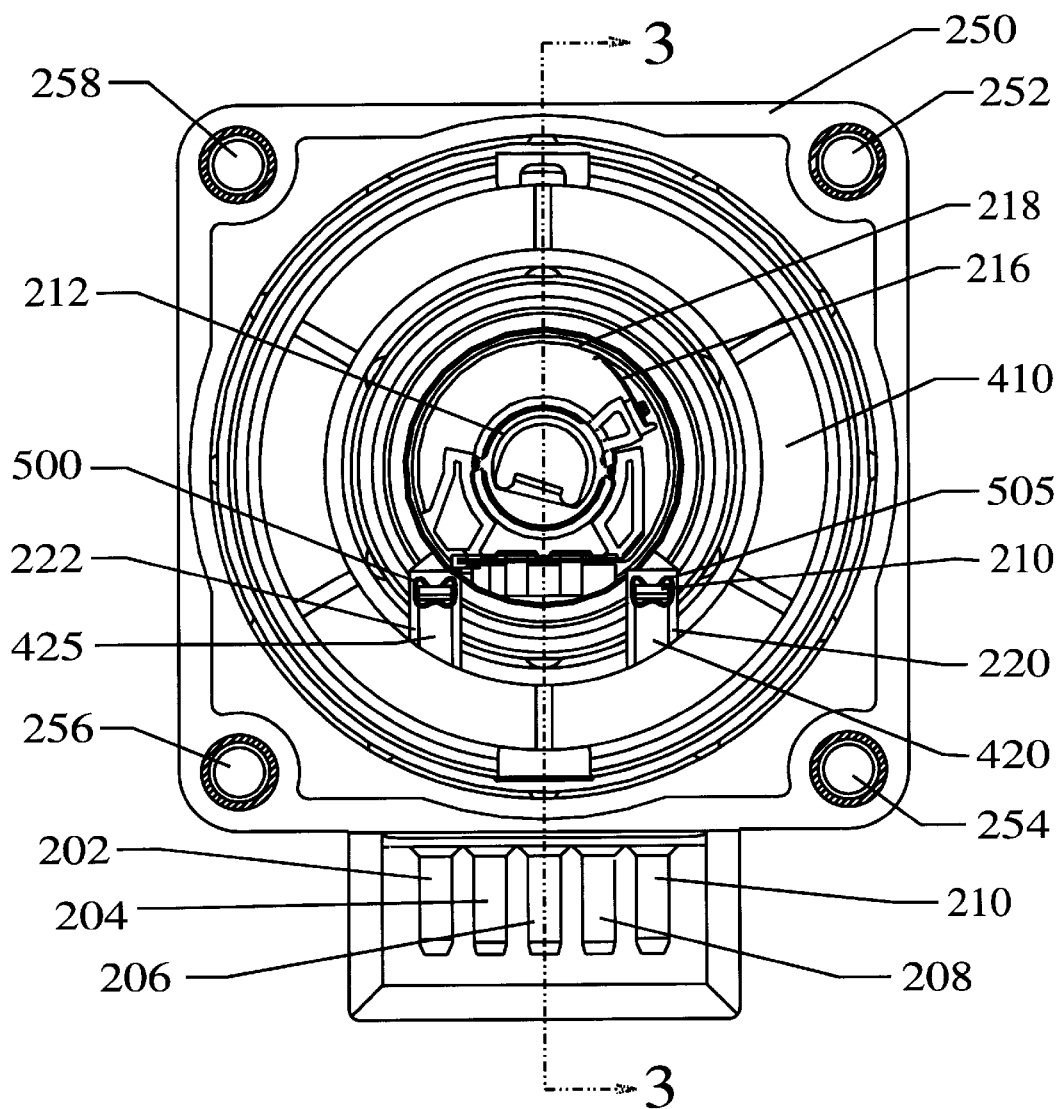
FIG. 2 illustrates the servomotor of FIG. 1 from a top view with the cover and retainer ring removed for improved viewing detail.
Figure 3:
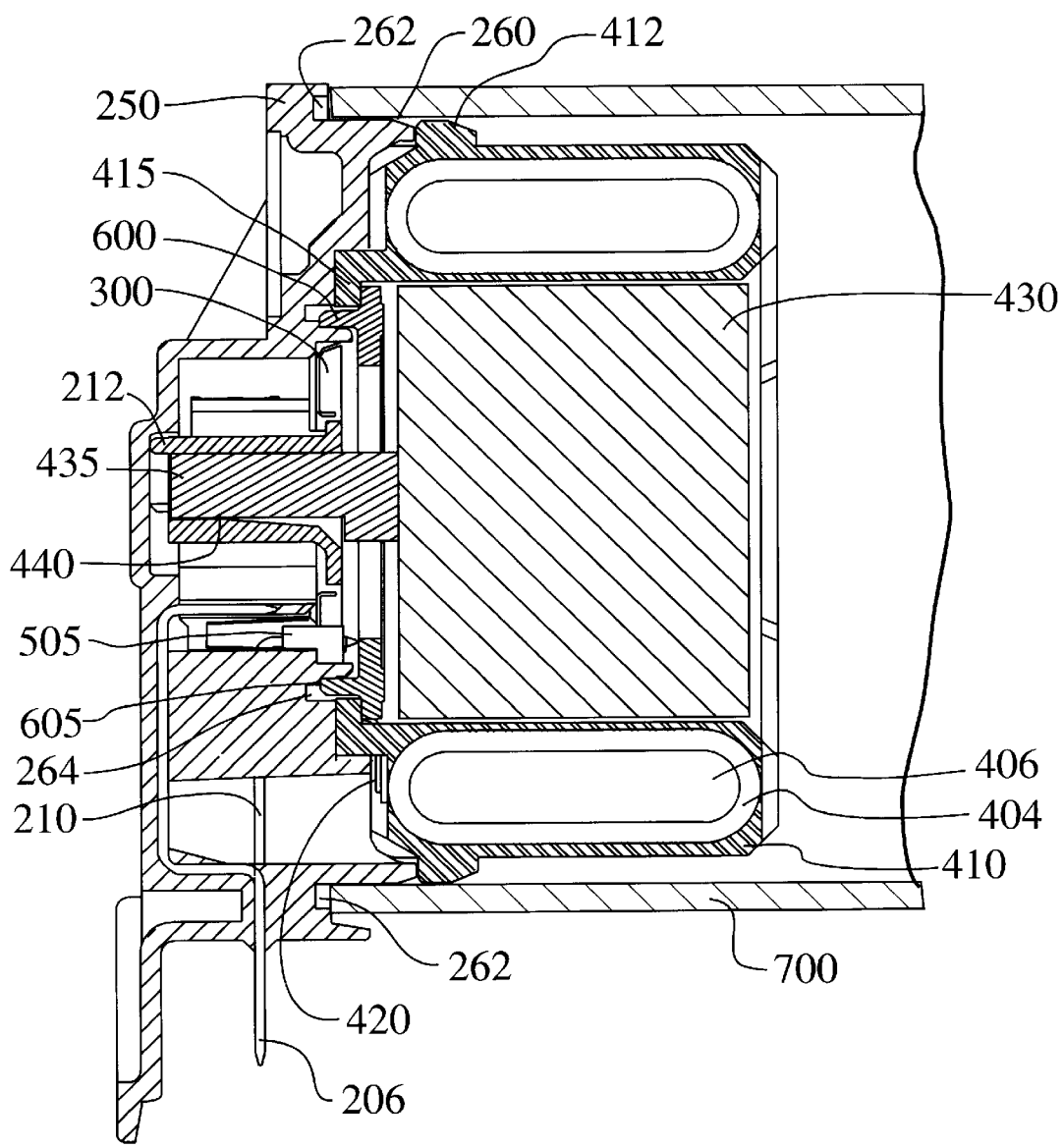
FIG. 3 illustrates a cross-section view of the servomotor of FIG. 2 taken along section line 3, with the cover and retaining ring in place.

FIGS. 1–3 illustrate servomotor 100, with FIG. 1 shown from an exploded view, without an armature for purposes of illustration. Therein, sensor 200 forms a base upon which the additional components may be assembled. Sensor 200 is very similar to those illustrated in U.S. Pat. Nos. 5,460,035 and 5,520,044 to Pfaffenberger and assigned to the present assignee, the teachings of which are incorporated herein by reference. Other sensors of the Hall effect type which can be adapted to the teachings of the present invention are illustrated in copending U.S. patent applications Ser. Nos. 08/206,982, 08/206,474, and 08/206,568 each filed Mar. 4, 1994 and assigned to the present assignee, and each incorporated herein by reference.

Into sensor 200 a cover 300 is placed, and onto sensor 200 stator 400 is placed. Stator 400 includes a wound coil 405 which has been overmolded with a plastic shell 410. While overmolding with plastic is illustrated, one of skill in the art will understand that molding is one of many alternatives available for encapsulating wound coil 405, and that shell 410 may be formed by potting or any other suitable alternative. Stator 400 additionally includes a retention lip 415 and electrical terminations 420 and 425 (termination 425 is visible in FIG. 2). Retention lip 415 is generally circular, but does not extend adjacent terminations 420 and 425, thereby ensuring as much access as possible to terminations 420, 425 during assembly. Termination clips 500 and 505 will assist in making electrical connection between terminations 420, 425 and the appropriate terminals within sensor 200. Retainer 600 fits along its outer diameter within stator 400 but not past retention lip 415.

Stator 400 is assembled to sensor 200 by first guiding terminals 420 and 425 into alignment passageways 220 and 222, and ultimately into contact with sensor terminals 202 and 210. Electrical connection between sensor terminal 210 and termination 420 is achieved with bow tie shaped termination clip 505, and electrical connection between sensor terminal 202 and termination 425 is similarly achieved with bow tie termination clip 500. Termination clips 500, 505 are pressed from the position shown in FIG. 1 into engagement with respective terminals 202, 210 and terminations 425, 420, where they provide a spring force to maintain each terminal in sound electrical contact with the respective termination. Other methods of electrical interconnection besides the bow tie design clips 500, 505 are contemplated, including other clip geometries and other methods such as soldering, spot welding and other known methods, depending upon the requirements for the specific application. However, bow tie termination clips 500 and 505 are preferred for ease of assembly.

Once electrical interconnection between sensor 200 and stator 400 is achieved, mechanical support is required. Mechanical support is obtained in the preferred embodiment through the attachment of stator shell 410 to sensor 200. While various methods were contemplated for this attachment, including direct attachment between stator shell 410 and sensor 200, in the preferred embodiment of the invention retainer 600 is used. Retainer 600 passes within the inner diameter of plastic shell 410. but not within retention lip 415. Retainer 600 is shaped to extend beyond retention lip 415 to engage sensor 200. In the preferred embodiment, retainer 600 is placed adjacent retention lip 415 and then pressed against sensor 200. Next, retainer 600 is ultrasonically welded to sensor 200. The space available for a motor armature on the inner diameter of stator 400 provides access for electrical connection with termination clips 500, 505, and also provides access required for the ultrasonic welding process. While ultrasonic welding is preferred due to the rapid assembly achieved. relatively low cost, and cleanliness of operation, other known methods of adhesion may also be used, such as gluing, heat staking, etc. However, the attachment method must take into consideration the desire to not disturb the components and features within sensor 200, so as to preserve the life and reliability of sensor 200.

The assembled servomotor 100 is illustrated in FIGS. 2 and 3. FIG. 2 shows from a top view the assembled servomotor, with cover 300, retainer 600 and armature 430 removed. to allow viewing of the many elements therein. FIG. 3 shows a cross-section of servomotor 100 with cover 300. retainer 600 and armature 430 in place, and also including throttle body barrel 700, otherwise taken along section line 3 of FIG. 2. Terminals 202 and 210 provide electrical connection to wound coil 405, which consists of winding 404 and coil core 406. Electrical connection is accomplished from terminal 210 to termination 420 with the aid of termination clip 505. Termination 420 may be soldered, spot welded, wire-wrapped or otherwise attached to winding 404, preferably prior to forming of plastic shell 410. Terminal 202 comprises the other electrical connection to winding 404, through termination clip 500 and termination 425. The additional terminals 204, 206 and 208 provide positive and negative supply voltage and sensed position output. It will be understood that one or more of these terminals can be combined, depending upon the requirements of each individual application.

Rotor cup 212 engages armature shaft 435 and is featured to be properly positioned therewith along shaft locator flat 440. As armature 430 is rotated, rotor cup 212 will also be rotated. This in turn causes movement of contactor 216, which provides electrical connection on resistance element 218. the position which is represented by a voltage which is transmitted through one of terminals 204–208. Sensor 200 additionally includes a housing 250 which has four mounting holes 252, 254, 256 and 258 therein. Mounting holes 252–258 are used to retain sensor 200 and stator 400 in place, and so are heavier than would normally be found on a prior art sensor.

Most visible in FIG. 3 are the press-fit diameters 260 and 412, and mounting stop 262. The present servomotor is designed specifically for throttle applications, and is designed to fit within barrel 700 on the side of a throttle body. Barrel 700 is cylindrical, so plastic shell 410 will be inserted first into barrel 700, then press-fit 412, next press-fit 260, and finally mounting stop 262 will engage barrel 700, thereby ensuring tight fit and proper mounting placement. Other features will be provided by one skilled in the art for other mounting geometries.

Also visible in FIG. 3 is the placement of retainer 600 into retainer groove 264. The inside diameter of welding protrusion 605 is slightly smaller than the inside diameter of retainer groove 264, causing interference between the two. Ultrasonic energy is used in the preferred embodiment to cause the interfering material to be flowed out as retainer 600 is welded to sensor housing 250. Retainer 600 also engages retention lip 415, thereby holding stator 400 to sensor 200. In this preferred embodiment, retainer 600 is placed inside stator 400. However, one of skill in the art will observe from the teachings herein that other placements are available, such as around the outer diameter of stator 400. When retainer 600 is placed inside stator 400, cover 300 may be formed integrally with retainer 600 as opposed to being formed separately as illustrated. By forming integrally, assembly is simplified and piece part count is further reduced.

Direct mechanical coupling between armature 430 and sensor 200 is illustrated in the preferred embodiment, though other coupling methods will be apparent to those skilled in the art. A variety of sensor types may be also used, including resistive, magnetoresistive, Hall cell, etc., depending upon the requirements of each particular servomotor application. Furthermore, shaft 435 may be the throttle shaft, onto which armature 430 has been placed.

It is very important that stator 400 be placed coaxially with rotor cup 212 and housing 250. Optimum motor performance requires an absolute minimum of clearance between stator 400 and armature 430. Lack of concentricity will either increase minimum tolerances required therebetween, or will lead to interference, which would adversely affect motor performance. To ensure concentricity, the coil and housing are fixtured together on a common pilot during ultrasonic welding.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. A position sensor combined with a motor stator coil energizable to rotate a motor rotor or armature comprising:
   a position sensor housing encompassing said position sensor and including a housing mounting portion for mounting said position sensor housing to a throttle body, said position sensor housing mounted to said throttle body adjacent an opening thereon and covering said opening;
   a motor stator coil housing encompassing said motor stator coil;
   connecting means for electrically connecting said motor stator coil through said position sensor housing; and
   retaining means for retaining said motor stator coil housing to said position sensor housing.

2. The position sensor coil combination of claim 1 wherein said motor stator coil is cylindrical with a center bore therethrough, having an inner circumference within said center bore and an outer circumference, said retaining means having a smaller inner diameter than said inner circumference of said center bore.

3. The position sensor coil combination of claim 2 wherein said retaining means further comprises a generally flat disc having a hole therethrough and a flange, said disc hole generally concentric to said center bore but of a smaller diameter, said disc further having an outer diameter greater than said retaining means inner diameter.

4. The position sensor coil combination of claim 3 wherein said flange is bonded to said position sensor housing.

5. The position sensor coil combination of claim 3 wherein said flange is ultrasonically bonded to said position sensor housing.

6. The position sensor coil combination of claim 4 wherein said position sensor is a rotary position sensor.

7. The position sensor coil combination of claim 1 further comprising:
   electrical sensor terminals attached to said position sensor and passing through said position sensor housing; and
   electrical motor terminals attached to said motor stator coil and electrically coupled to said connecting means.

8. The position sensor coil combination of claim 7 wherein said connecting means comprises one of said electrical sensor terminals.

9. The position sensor coil combination of claim 8 further comprising an external electrical connector housing attached to said sensor housing for electrically coupling said electrical sensor terminals and said connecting means to at least one external device.

10. The position sensor coil combination of claim 1 further comprising a retention protrusion extending from said motor stator coil housing for engagement with said retaining means.

11. The position sensor coil combination of claim 1 wherein said motor stator coil and said position sensor share a common electrical ground within said connecting means.

12. The position sensor coil combination of claim 1 wherein said housing mounting portion further comprises a mounting hole.

13. The position sensor coil combination of claim 1 wherein said housing mounting portion further includes said connecting means.

14. The position sensor coil combination of claim 1 wherein said opening in said throttle is a barrel.

15. A throttle body servomechanism located within a barrel extending from a throttle body for rotating a throttle butterfly about a throttle shaft comprising:
   a rotary position sensor having an opening receiving said throttle shaft therein and having electrical terminals extending therefrom and further having sensor locating means to locate said rotary position sensor relative to said barrel;
   a motor stator electrically connected to said electrical terminals, said motor stator coaxial with said throttle shaft and having said throttle shaft passing therethrough, said motor stator having motor stator locating means to locate said motor stator relative to said barrel, wherein said rotary position sensor covers said barrel;

a motor armature mechanically connected to said throttle shaft and coaxial therewith, said motor armature concentric and inside of said motor stator; and a retainer means for retaining and rigidly attaching said motor stator to said rotary position sensor.

16. The throttle body servomechanism of claim 15 further comprising a resistance element and a contactor within said rotary position sensor which provide a potentiometric indication of a relative rotary position of said throttle shaft.

* * * * *